United States Patent
Zhang et al.

(10) Patent No.: US 11,263,108 B2
(45) Date of Patent: Mar. 1, 2022

(54) DEVICE FOR TESTING BLOCKCHAIN NETWORK

(71) Applicant: FUJITSU LIMITED, Kawasaki (JP)

(72) Inventors: Shenbin Zhang, Beijing (CN); Bingfeng Pi, Beijing (CN); Jun Sun, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 63 days.

(21) Appl. No.: 16/847,822

(22) Filed: Apr. 14, 2020

(65) Prior Publication Data

US 2020/0327030 A1 Oct. 15, 2020

(30) Foreign Application Priority Data

Apr. 15, 2019 (CN) .......................... 201910298897.3

(51) Int. Cl.
*G06F 11/34* (2006.01)
*H04L 9/06* (2006.01)

(52) U.S. Cl.
CPC ...... *G06F 11/3428* (2013.01); *G06F 11/3419* (2013.01); *G06F 11/3433* (2013.01); *H04L 9/0637* (2013.01)

(58) Field of Classification Search
CPC ............ G06F 11/3419; G06F 11/3428; G06F 11/3433; H04L 41/08; H04L 41/083; H04L 43/08; H04L 43/50; H04L 9/0637

USPC ........................................................ 702/186
See application file for complete search history.

(56) References Cited

U.S. PATENT DOCUMENTS

2019/0362361 A1* 11/2019 Irazabal ................ G06Q 20/42

FOREIGN PATENT DOCUMENTS

| CN | 109194506 A | 1/2019 |
|---|---|---|
| WO | WO 2019/032113 A1 | 2/2019 |

OTHER PUBLICATIONS

Extended European Search Report dated Jul. 15, 2020 in related European Patent Application No. 20151405.6 (9 pages).

(Continued)

*Primary Examiner* — John H Le
(74) *Attorney, Agent, or Firm* — Staas & Halsey LLP (57) ABSTRACT

A device for testing a blockchain network is provided. The device includes a processor. The processor is configured to calculate a matching degree between a configuration of the blockchain network and a template configuration corresponding to application scenario of the blockchain network; calculate performance of the blockchain network; calculate a health degree for the blockchain network; and determine whether the blockchain network is in a stable state based on the matching degree, the performance and the health degree.

11 Claims, 7 Drawing Sheets

(56) References Cited

OTHER PUBLICATIONS

Blog et al.; "Measuring Blockchain Performance with Hyperledger Caliper-Hyperledger"; Mar. 19, 2018; pp. 1-4; XP055712237, retrieved from the internet: <URL:http://www.hyperledger.org/blog/2018/03/19/measuring-blockchain-performance-with-hyperledger-caliper> (retrieved on Jul, 7, 2020); pp. 1, 2 (4 pages).
Qing Sude Caict China: "Updated text of D3.3-Assessment criteria for DLT platforms; DLT-0-065"; ITU-T Draft; Study Period 2017-2020; Study Group 20; Series DLT-0-065, International Telecommunication Union,, Geneva; CH, vol. ties/20 Apr. 14, 2019 (Apr. 14, 2019); pp. 1-17, XP044265770, retrieved from the internet: <URL:https://www.itu.int/ifa/t/2017/sg20/docs/190409/td/ties/gen/T17-SG20-190409-TD-GEN-1249!!ZIP-E.zip/td1249-attachment-Att5_DLT-LS-016_DLT-0-065.docx> (retrieved on Apr. 14, 2019), figures 1-3, paragraph [9performance]; (17 pages).
"BlockChain—LinuxONE," IBM Corporation, 2016 (30 pages).

\* cited by examiner

DEVICE FOR TESTING BLOCKCHAIN NETWORK

CROSS-REFERENCE TO RELATED APPLICATIONS

This application is based on and hereby claims priority under 35 USC 119 to Chinese Patent Application No. 201910298897.3, filed on Apr. 15, 2019, in the China National Intellectual Property Administration, the entire contents of which are incorporated herein by reference.

FIELD

The present disclosure relates to configuration, creation and management of a blockchain network by a computer device, and in particular to configuration, creation and management of a fabric network.

BACKGROUND

Over the past few years, blockchain technology has developed rapidly, which is benefit from success in bitcoin and crypto-currency. A blockchain (which is also known as distributed ledger) is essentially an append-only data structure, and is maintained by a group of nodes that do not fully trust each other.

All nodes in a blockchain network consent to a group of ordered blocks each including multiple transactions. as such, the blockchain may be regarded as a log of ordered transactions. Blockchains may be classified into multiple categories, for example, public blockchain, private blockchain, consortium blockchain, etc. The present disclosure focuses on the consortium blockchain such as hyperledger fabric network.

In the related art, it is difficult to maintain and monitor a runtime fabric network. It is also a tedious work to dynamically maintain the fabric network, for example, adding peer(s) and organization(s). Further, it is a challenge to test reasonability and to monitor performance and health condition of the network.

In addition, it is complex and time-consuming to configure the fabric network with a conventional method. The fabric network includes a large number of components, and therefore it is difficult for a developer to configure the fabric network. Besides, it is not easy for a novice to configure the fabric network even when the network is simple. Further, for the novice, there is high cost of learning the principle of configuration of the fabric network. For those skilled developers, creating a new fabric network is complex and error-prone due to tedious and heavy configuration work.

Therefore, the present disclosure aims to solve the above problems.

It should be noted that the above description of the background part is only for clearly and completely illustrating technical solutions of the present disclosure, to help those skilled in the art to understand the technical solutions. It should be not considered that the above technical solutions are well known by those skilled in the art only because the technical solutions are illustrated in the background part.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

An object of the present disclosure is to provide a technology for testing a blockchain network. After a fabric network is created, the technology may easily update a configuration of the network and test reasonability of the network, and also automatically monitor health condition of the network. Further, if errors occur in transactions of the network, a notification can be made, and a recommendation for modifying the configuration of the network can be provided.

In order to achieve the object of present disclosure, a device for testing a blockchain network is provided in an aspect of the present disclosure. The device includes a processor. The processor is configured to: calculate a matching degree between a configuration of the blockchain network and a template configuration corresponding to application scenario of the blockchain network; calculate performance of the blockchain network; calculate a health degree for the blockchain network; and determine whether the blockchain network is in a stable state based on the matching degree, the performance and the health degree.

With the technology for testing a blockchain network provided in the present disclosure, after a fabric network is created, the configuration of the network can be easily updated and reasonability of the network can be tested. Further, health condition of the network can be automatically monitored. If errors occur in transactions of the network, a notification can be made, and a recommendation for modifying the configuration of the network can be provided.

BRIEF DESCRIPTION OF THE DRAWINGS

The above and other objects, features and advantages of the present disclosure may be easily understood from the following description for embodiments of the present disclosure given in conjunction with the drawings. In the drawings.

DETAILED DESCRIPTION OF EMBODIMENTS

Exemplary embodiments of the present disclosure are described hereinafter in conjunction with the drawings. For the sake of conciseness and clarity, not all features of a practical implementation are described in this specification. However, it should be understood that a number of implementation-specific decisions may be made during the development of any such practical implementation in order to achieve specific targets of the developer. These decisions may vary depending on the implementation.

It should be understood by those skilled in the art that aspects of the exemplary embodiments may be implemented as a system, a method or a computer program product. Therefore, the aspects of the exemplary embodiments may be implemented by only hardware embodiments, only software embodiments (including firmware, resident software, microcode and the like) or embodiments combining software with hardware, which may generally be called as "circuits", "modules" or "systems" respectively in the present disclosure. In addition, the aspects of the exemplary embodiments may be implemented as computer program products embodied as one or more computer readable mediums. The computer readable medium stores computer readable program codes. The computer programs may be distributed by a computer network, may be installed on one or more remote servers, or may be embedded in a device memory.

Any combination of the one or more computer readable mediums may be used. The computer readable medium may be a computer readable signal medium or a computer readable storage medium. The computer readable storage medium may be but is not limited to a system, an apparatus, or a device in an electronic, magnetic, optical, electromagnetic, infrared, or semi-conductive form, or any combination thereof. Specific examples (which are non-exhaustive) of the computer readable storage medium may include, but not limited to, electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium including or storing a program. The program may be used by or associated with a command execution system, apparatus or device.

The computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof.

The computer readable signal medium may be any other computer readable medium than the computer readable storage medium that can send, transmit or transfer the program that is used by or associated with a command execution system, apparatus or device.

The program codes stored in the computer readable medium may be transmitted via any proper medium including but not limited to wireless, a wire, an optical cable, radio frequency and the like, or any proper combination thereof.

Computer program codes for executing operation of the aspects of the exemplary embodiments disclosed herein may be written in one or more programming languages or a combination thereof. The programming languages may include an object-oriented programming language such as Java, Smalltalk, C++, and may further include a conventional procedural programming language such as "C" or the like.

The aspects of the exemplary embodiments disclosed herein are described with reference to flowcharts and/or block diagrams of the methods, devices (systems) and computer program products according to the exemplary embodiments. It should be understood that, each flow and/or block in the flowcharts and/or block diagrams and a combination of flows and/or blocks in the flowcharts and/or block diagrams may be implemented by computer program instructions. The computer program instructions may be provided to a general-purpose computer, a dedicated computer, or processors of other programmable data processing devices to generate a machine, so that the instructions executed by the computer or the processors of the other programmable data processing devices generate a device for implementing functions/operations specified in flows and/or blocks of the flowcharts and/or the block diagrams.

The computer program instructions may also be stored in a computer readable medium which can guide the computer or other programmable data processing devices to operate in a certain manner, so that the instructions stored in the computer readable medium generate a product including an instruction device which implements functions/operations specified in flows and/or blocks of the flowcharts and/or the block diagrams.

The computer program instructions may also be loaded to the computer or other programmable data processing devices, so that the computer or the other programmable data processing devices perform a series of operation steps to generate processing implemented by the computer, and thus the instructions executed on the computer or the other programmable devices provide processing implementing the functions/operations specified in flows and/or blocks of the flowcharts and/or the block diagrams.

Distributed ledgers are databases distributed on multiple nodes or computer devices. Each node may copy and store one ledger, and may perform updating independently. The ledgers are not maintained by any central agency, and updates of the ledgers are respectively created and recorded by the corresponding nodes independently. The nodes may vote for the updates, to ensure that the updates conform to opinions of the majority of the nodes. The voting is called as consensus, which is automatically achieved by an algorithm. Once the consensus is achieved, the distributed ledgers can be updated automatically, and the latest agreed version of the distributed ledgers are respectively stored in the corresponding nodes. With the distributed ledger technology, trust cost can be significantly reduced, thereby reducing people's dependency on banks, governments, lawyers, notaries and the like. Further, problems of consumer protection, financial integrity and transaction speed can be solved.

The blockchain technology is a form of the distributed ledger technology. Not all distributed ledgers provide a secure and valid distributed consensus by using a series of blocks. All blocks are distributed on a point-to-point network. Since the blockchain is a distributed ledger, the blockchain may exist without management of a server, and data quality of the blockchain may be maintained by database copying and calculating confirmation. However, the blockchain is distinctly different from other forms of distributed ledgers due to an append-only data structure of the blockchain. Data on the blockchain is grouped in different blocks. The blocks are linked to each other and may be protected by the encryption technology. The blockchain is essentially an increasing record list. Due to a structure of the blockchain, the data is only allowed to be added to the database, and previously input data is not allowed to be modified or deleted. Therefore, the blockchain technology is suitable for recording events, managing records, processing transactions, tracking assets and voting.

The following embodiments are given for a consortium blockchain, for example, a hyperledger fabric network. It should be noted that, a term "peer" herein indicates a device or devices corresponding to an organization of an entity, in a peer network of the devices included in the fabric network, and a term "node" herein indicates a device, for example, a transaction node device in the peer network in the fabric network, i.e., a node corresponding to a transaction.

Figure 1:
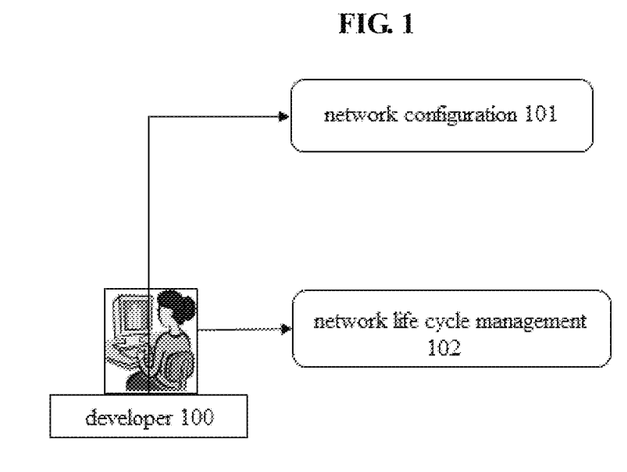
FIG. 1 is a schematic diagram showing a system framework for configuration and management for a blockchain network in the conventional technology.

FIG. 1 is a schematic diagram showing a system framework for configuration and management for a blockchain network in the conventional technology.

As shown in FIG. 1, a developer 100 may customize a configuration of a network by using a network configuration module 101, for example, adding peer(s), order node(s) and certificate authorities (CA(s)). Further, the developer may configure channel(s) and chaincode, and set endorsing policy. The developer 100 may manage the network by using a network life cycle module 102, for example, adding peer(s) or organization(s), issuing a certificate, and the like.

However, the conventional system for configuration and management for a blockchain network shown in FIG. 1 is not easily maintained and monitored during operation. The fabric network should be dynamically maintained, for example, add a peer and an organization, which is tedious and cannot be implemented by the conventional system for configuration and management for a blockchain network shown in FIG. 1. Further, challenges of how to test a reasonability, and how to monitor a network performance and a health condition are required to be solved.

Configuration for a blockchain network is firstly described below with reference to FIG. 2.

Figure 2:
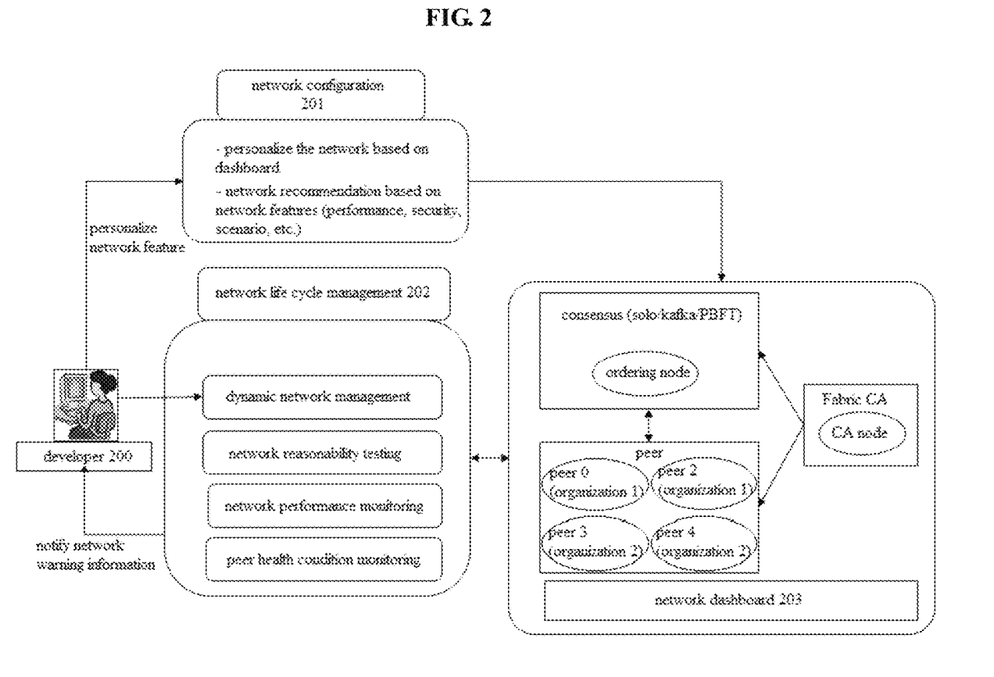
FIG. 2 is a schematic diagram showing configuring a blockchain network by a device for configuring a blockchain network according to an exemplary embodiment of the present disclosure.

FIG. 2 is a schematic diagram showing configuring a blockchain network by a device for configuring a blockchain network according an exemplary embodiment of the present disclosure.

In a network configuration module 201 shown in FIG. 2, a developer may customize a network configuration based on a dashboard. Further, the network configuration may be automatically recommended based on preferred functions of the developer. The dashboard can acquire real-time data from multiple data sources, and has a customized interactive interface. The dashboard provides a convenient way for data interaction and customization with a rich and interactive visual interface.

Customize Network Based on Dashboard

The developer may drag and drop a network component on the dashboard to create a fabric network. For example, the developer may set a peer, an order form, and the number of the CA nodes, and combine the peer, the order form and the number of the CA node in a network on the dashboard. Next, the developer may add the peer to different channels. The developer may also deploy or instantiate a chaincode on the peer, and set an endorsing policy.

Network Recommendation Based on Performance, Security and Scenario

In a case that the developer is to develop a decentralized application (dapp), the developer is required to create a fabric network to execute the dapp, which is difficult for the developer. Generally, the developer cannot create a proper network for the dapp. In this case, the network configuration may be automatically recommended to the developer by the device for configuring a blockchain network according the embodiment of the present disclosure, to avoid a tedious and error-prone configuration.

Firstly, the developer customizes a scheme, for example, a supply chain, finance, Internet of Things and electronic data storage for the dapp. Then, the device for configuring a blockchain network according to the embodiment of the present disclosure generates a default configuration for the customized scheme.

Secondly, the developer may define a weight of network function. Since the blockchain cannot achieve the performance and the security simultaneously, the performance or the security may be emphasized by using different weights according to demands in configuring the network.

For example, the weight of network function including the performance and the security is defined by the developer as follows.

$$\text{weight(performance)}=w1, \text{weight(security)}=w2 \quad (1)$$

The developer defines the number of organizations, org-Count, and the maximum number of peers for each organization, maxOrgPeerCount. If a network includes a great number of peers, the security of the network is high. For a blockchain network, each organization includes at least one peer. Then, the number of peers for each organization is automatically recommended based on the security, which is expressed as follows.

$$\text{PeerCount}(org_i)=1+(\text{maxOrgPeerCount}-1)*\text{weight}(\text{security}) \quad (2)$$

Similarly, the number of CA nodes, which is automatically recommended, is expressed as follows.

$$\text{CaNodeCount}=\text{orgCount}*\text{weight(security)} \quad (3)$$

In most cases requiring security, each organization provides one order node. In this case, some organizations may be selected to provide order nodes. If the security weight is high, the device for configuring a blockchain network according to the embodiment of the present disclosure automatically selects many organizations to provide order nodes. The order nodes are important and receive transactions including a proposal response for the endorsement. The transactions are packed in blocks, and the blocks are distributed to peers connected with the order nodes. The concept of the order node should be understood by those skilled in the art, which is not described in detail herein. The number of order nodes is determined according to the following formula (4).

$$\text{orderNodeCount}=\text{orgCount}*\text{weight(security)} \quad (4)$$

The device for configuring a blockchain network according to the exemplary embodiment of the present disclosure may recommend a consensus algorithm based on performance weight and security weight in the following manner.

TABLE 1

Feature weights for different consensuses

|  | performance weight | security weight |
|---|---|---|
| solo | 0~0.33 | 0.33~0.66 |
| pbft | 0.33~0.5 | 0.66-1 |
| kafka | 0.5~1 | 0~0.5 |

In a case that the developer selects the kafka node in Table 1, the number of the kafka node is expressed by the following formula (5) based on Table 1.

$$kafkaNodeCount=orgCount*weight(security) \quad (5)$$

The device for configuring a blockchain network according to the exemplary embodiment of the present disclosure automatically recommends an endorsing organization and a peer to the developer.

$$endorseOrgCount=orgCount*weight(security) \quad (6)$$

$$endorsePeerCount(orgi)=peerCount(orgi)*weight(security) \quad (7)$$

where endorseOrgCount denotes the number of endorsing organizations, and endorsePeerCount denotes the number of endorsing peers for an organization.

If the performance weight is greater than 0.5, the endorsing policy is set as "and", which is expressed as (orgi Mi out Ni) AND (orgj: mj out of Nj). If the endorsing policy is set as "or", the specific policy is expressed as (orgi Mi out Ni) OR (orgj: mj out of Nj).

Scenario Matching Based on Network Configuration

According to recommendations of the device for configuring a blockchain network according to the exemplary embodiment of the present disclosure, the developer may modify the configuration of the network shown in the following formula (8). Finally, a configuration similarity between a scenario and a user-defined network is calculated according to the following formula (9). In a case that the scenario does not match the user-defined network, the developer may modify the configuration. As for the measurement of configuration similarity, a well-known measurement in the art may be adopted. For example, calculation of distance between vectors can be used according to formula (9), but the present disclosure is not limited thereto.

$$networkFeature = (peerCount, CaCount, OrderCount, consensus, endorsePolicy, channel) \quad (8)$$

$$networkSimilarity = \frac{network(scenarioTemplate) * network(userDefined)}{|network(scenarioTemplate)| \; |network(userDefined)|} \quad (9)$$

The configuration shown in FIG. 2 may be implemented by a device for configuring a blockchain network. The device includes a processor. The processor is configured to: present, by a display device, configuration elements of the blockchain network to a user; create or acquire the blockchain network in response to visualized inputs of the configuration elements selected by the user; determine security, performance and an application scenario for the blockchain network; calculate a current configuration of the blockchain network based on the security, the performance and the application scenario of the blockchain network; and perform a configuration for the blockchain network based on the generated configuration. After the blockchain network is configured by using the method shown in FIG. 2, the configured blockchain network is tested by a device for testing a blockchain network shown in FIG. 3. It should be noted that the device for testing a blockchain network shown in FIG. 3 may be used to test a blockchain network configured in other manner than the automatic configuration manner shown in FIG. 2.

Figure 3:
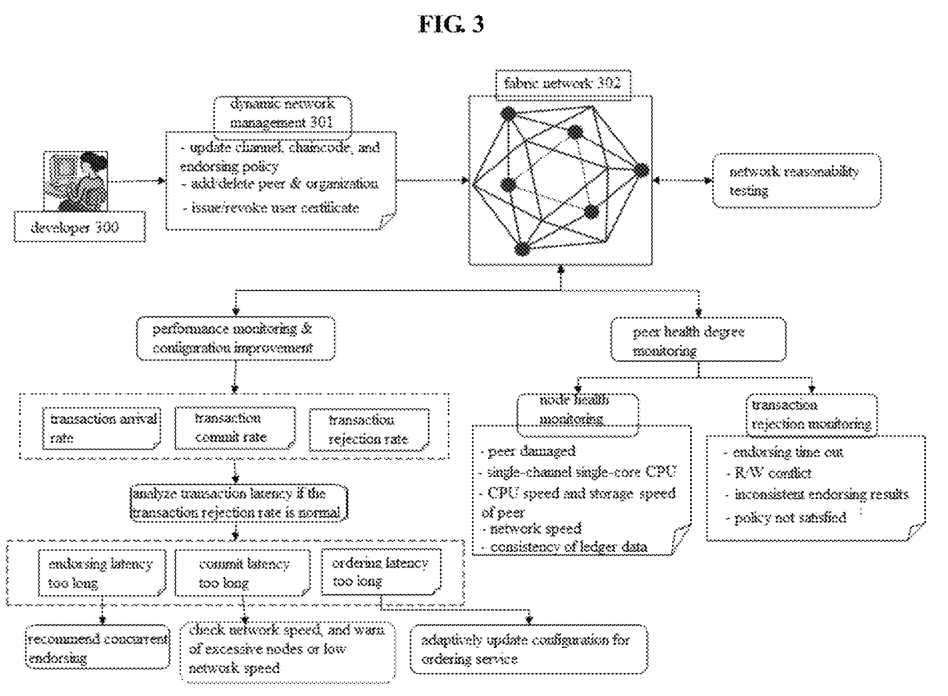
FIG. 3 is a schematic diagram showing testing a blockchain network by a device for testing a blockchain network according to an exemplary embodiment of the present disclosure.

FIG. 3 is a schematic diagram showing testing on a blockchain network by a device for testing a blockchain network according to an exemplary embodiment of the present disclosure.

The developer is provided with a device for testing and managing a fabric network, to test and manage the fabric network in accordance with a process shown in FIG. 3.

Firstly, a developer 300 manages a runtime network by a dynamic network managing module 301 by using a dashboard. For example, the developer 300 may update channel, chaincode and endorsing policy, add/delete peer and organization, and issue and revoke a user certificate.

Secondly, the device for testing a blockchain network according to the exemplary embodiment of the present disclosure evaluates a reasonability of a fabric network 302 in real time based on the scenario, the performance and the health condition of the network.

Thirdly, the device for testing a blockchain network according to the exemplary embodiment of the present disclosure monitors performance of the fabric network 302 in real time and modify a configuration of the fabric network 302. If a TPS becomes quite low, the device may analyze a latency time of each transaction to find out a phase during which the TPS is lowered.

Fourthly, the device for testing a blockchain network according to the exemplary embodiment of the present disclosure monitors a health condition of each peer in the fabric network 302 in real time. The device monitors each peer node to test whether the peer node operates normally. Further, the device may automatically analyze the cause of transaction rejection.

Test on Reasonability of Network

In the test on the reasonability of network shown in FIG. 3, a score of reasonability is calculated for the currently running fabric network according to the following formula (10).

$$reasonabilityScore=networkSimilarity(current,scenarioTemplate)*\alpha+networkPerformanceScore*\beta+peerAverageHealthScore*\gamma \quad (10)$$

where networkPerformanceScore denotes a score of the performance of network, peerAverageHealthScore denotes an average score of health degrees of peers, and $\alpha$, $\beta$, and $\gamma$ respectively denotes preset weights or weights that are set as needed. In a case that the score of the reasonability is less than a threshold, data of the ledger is backed up, the network is suspended, and the developer is notified of the fact. The average score of health degrees of peers is expressed by the following formula (14).

Monitoring on Performance of Each Transaction

In the monitoring on the performance and modification to the configuration shown in FIG. 3, the score of the performance of the network is calculated according to the following formula (11).

$$networkPerformanceScore=\frac{txCommitRate}{txArrivalRate} \quad (11)$$

where txCommitRate denotes transaction commit rate, and txArrivalRate denotes transaction arrival rate. A low score of the performance of the network may be caused by a high transaction rejection rate or a long transaction latency time. In the case of the high transaction rejection rate, the cause of rejection is analyzed and notified to the developer.

In addition, as shown in FIG. 3, in the case of a normal transaction rejection rate, the device for testing a blockchain network according to the exemplary embodiment of the present disclosure further analyzes a latency time of each transaction.

$$txLatencyTime = txEndorsingTime + txOrderTime + txCommitTime \quad (12)$$

In the formula (12), txLatencyTime denotes transaction endorsing latency, txOrderTime denotes transaction ordering latency, and txCommitTime denotes transaction commit latency. The latency time in each phase has a default range of value. It is abnormal if the latency time in each phase is greater than the maximum value, which will result in deterioration of the performance of the network.

As shown in FIG. 3, if the transaction endorsing latency is long, an idle peer may be recommended to a client based on the score of the health degree. Then, the client is advised to concurrently recall transactions (recommending concurrent endorsing).

If the transaction commit latency is long, network speed is checked for all peers. If the network speed is normal, warning information indicating excessive network nodes is provided to the client, and the client is advised to delete some peers with low health degree scores.

If the transaction ordering latency is long, a configuration of ordering service is adaptively updated.

If the transaction arrival rate is quite low, blocks having a small size (the number of transactions in each block is small) is defined, and a time interval at which the blocks are generated is increased. In this way, the ordering configuration can be dynamically adapted to the transaction arrival rate, and the TPS can be enhanced.

If the transaction arrival rate is quite high, blocks having a big size are defined, and the time interval at which the blocks are generated is reduced.

Monitoring on Network Health

The device for testing a blockchain network according to the exemplary embodiment of the present disclosure may further monitor running conditions of transaction nodes of each peer, to test whether the transaction nodes operate normally. For example, as shown in FIG. 3, in the function of node health condition monitoring, it is tested whether the peer is damaged, whether each channel has a CPU core corresponding thereto, whether CPU speed and storage speed of the peer are normal, whether the network speed is normal, whether the ledger data is consistent between different peers. A score of a transaction node of the peer is calculated according to the following formula (13).

$$peerNodeHealthScore = peerAlive*\alpha_1 + cpuCore*\alpha_2 + cpuRate*\alpha_3 + memoryRate*\alpha_4 + networkSpeed*\alpha_5 + ledgerConsistent*\alpha_6 \quad (13)$$

If the health condition of the peer is affected by a factor, a score for the factor is 100. Otherwise, the score for the factor is zero.

Figure 4:
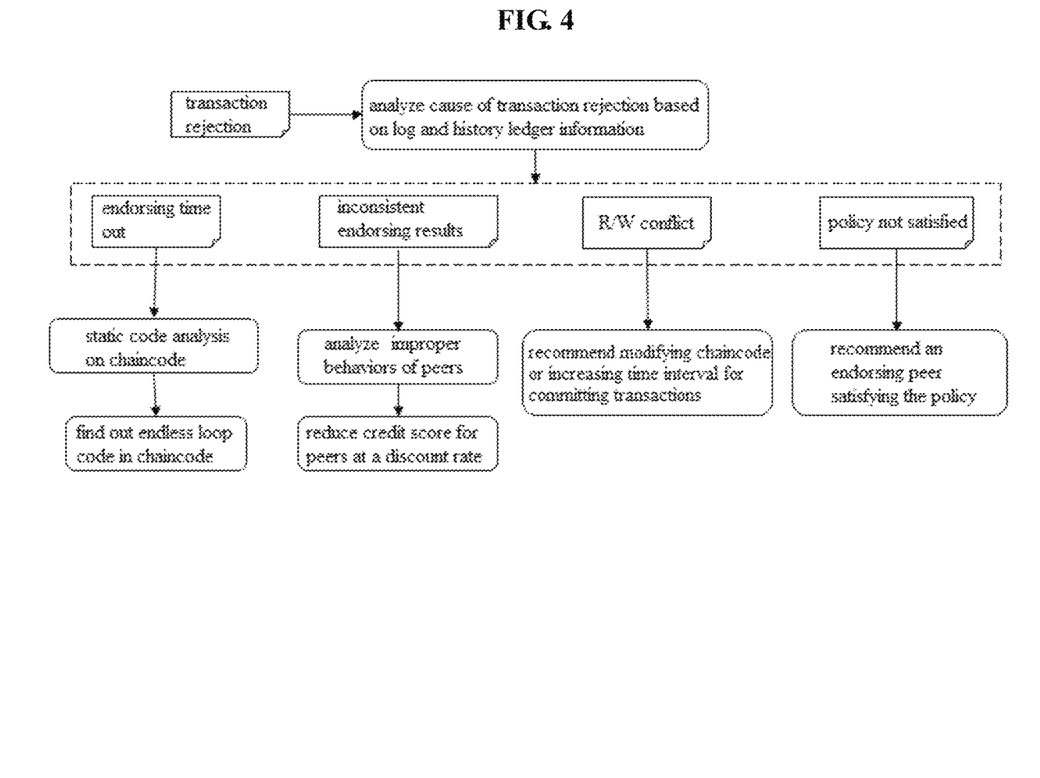
FIG. 4 is a schematic diagram showing analyzing transaction rejection by the device for testing a blockchain network according to the exemplary embodiment of the present disclosure.

In addition, as shown in FIG. 3, the device for testing a blockchain network may further monitor a transaction rejection of a peer in real time. In the function of monitoring transaction rejection shown in FIG. 3, four causes of transaction rejection are exemplarily analyzed, namely, endorsing time out, R/W conflict, inconsistent endorsing results, and endorsing policy being not satisfied. Analyzation and processing of the transaction rejection by the device for testing a blockchain network according to an exemplary embodiment of the present disclosure is illustrated with reference to FIG. 4. As shown in FIG. 4, the cause of transaction rejection is analyzed based on log and history ledger data. There may be four causes of the transaction rejection shown in FIG. 4.

Firstly, the endorsing times out. In this case, the device for testing a blockchain network according to the exemplary embodiment of the present disclosure may perform a static code analysis on the chaincode, and find out an endless loop code in the chaincode, and then notify the developer to delete the endless loop code.

Secondly, the endorsing results are inconsistent. In this case, the device for testing a blockchain network according to the exemplary embodiment of the present disclosure may analyze improper behaviors, and reduce credit score for the peers at a discount rate. Further, if the peers return endorsing results inconsistent with each other, the score of the healthy degree of each of the peers may be affected.

$$peerHealthScore = peerNodeHealth*\alpha + peerCreditScore*\beta \quad (14)$$

Thirdly, there is R/W conflict. In this case, the device for testing a blockchain network according to the exemplary embodiment of the present disclosure may advise the developer to modify the chaincode to avoid repeatedly using secret keys, or to increase time interval when committing the transaction.

Fourthly, the endorsing policy is not satisfied. In this case, the device for testing a blockchain network according to the exemplary embodiment of the present disclosure may recommend to the client an endorsing peer satisfying the policy.

Figure 5:
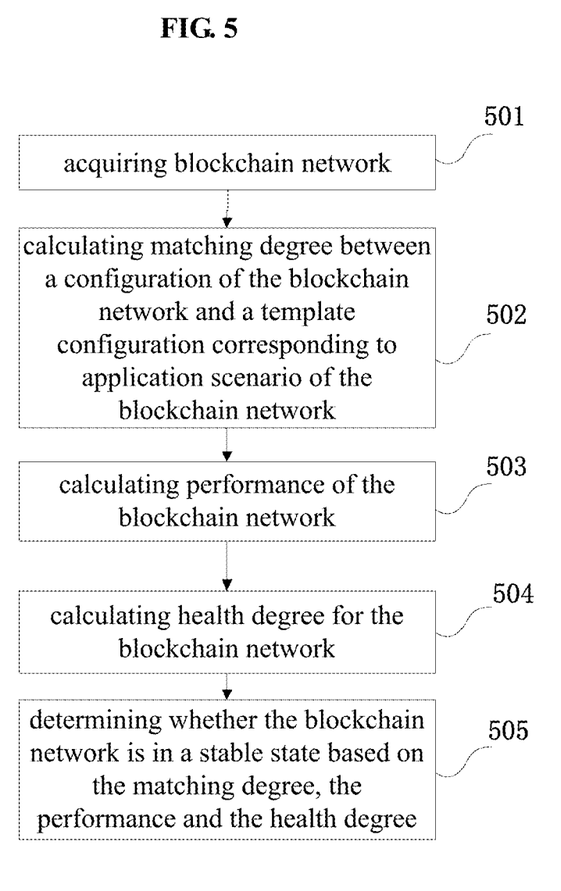
FIG. 5 is a flowchart showing a method for testing a blockchain network that is performed by the device for testing a blockchain network according to the embodiment of the present disclosure.

FIG. 5 is a flowchart showing a method for testing a blockchain network that is performed by the device for testing a blockchain network according to the embodiment of the present disclosure.

Firstly, in step 501, a blockchain network is acquired. Next, a matching degree between a configuration of the blockchain network and a template configuration corresponding to an application scenario of the blockchain network is calculated in step 502. In step 503, performance of the blockchain network is calculated. In step 504, a health degree for the blockchain network is calculated. Finally, it is determined whether the blockchain network is in a stable state based on the matching degree, the performance and the health degree in step 505.

Figure 6:
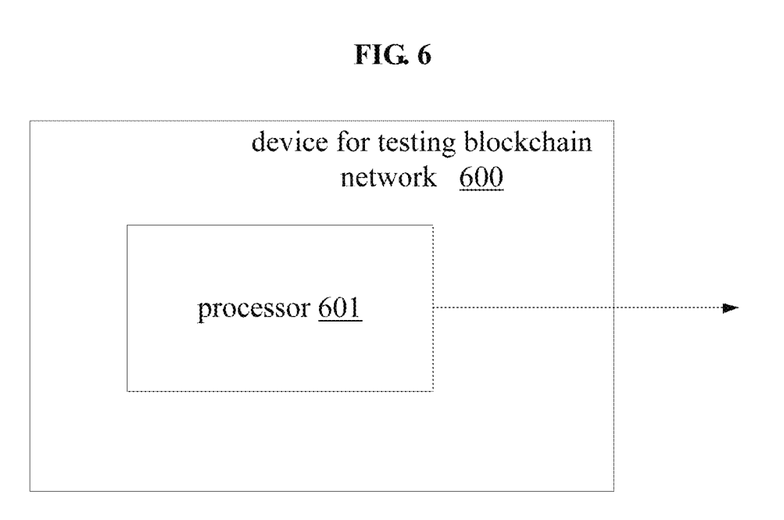
FIG. 6 is a schematic structural diagram of the device for testing a blockchain network according to the embodiment of the present disclosure.

FIG. 6 is a schematic structural diagram of the device for testing a blockchain network according to the embodiment of the present disclosure. A device 600 for testing a blockchain network shown in FIG. 6 includes at least one processor 601 configured to perform the method for testing a blockchain network. Specifically, the at least one processor 601 is configured to: calculate a matching degree between a configuration of a blockchain network and a template configuration corresponding to an application scenario of the blockchain network; calculate performance of the blockchain network; calculate a health degree for the blockchain network; and determine whether the blockchain network is in a stable state based on the matching degree, the performance and the health degree. The at least one processor 601 is further configured to perform other steps as described above. In addition, the device for testing a blockchain network may further include a storage unit and/or a communication unit (which are not shown). The storage unit is configured to store to-be-recognized data. The communication unit is configured to receive and/or transmit data.

Figure 7:
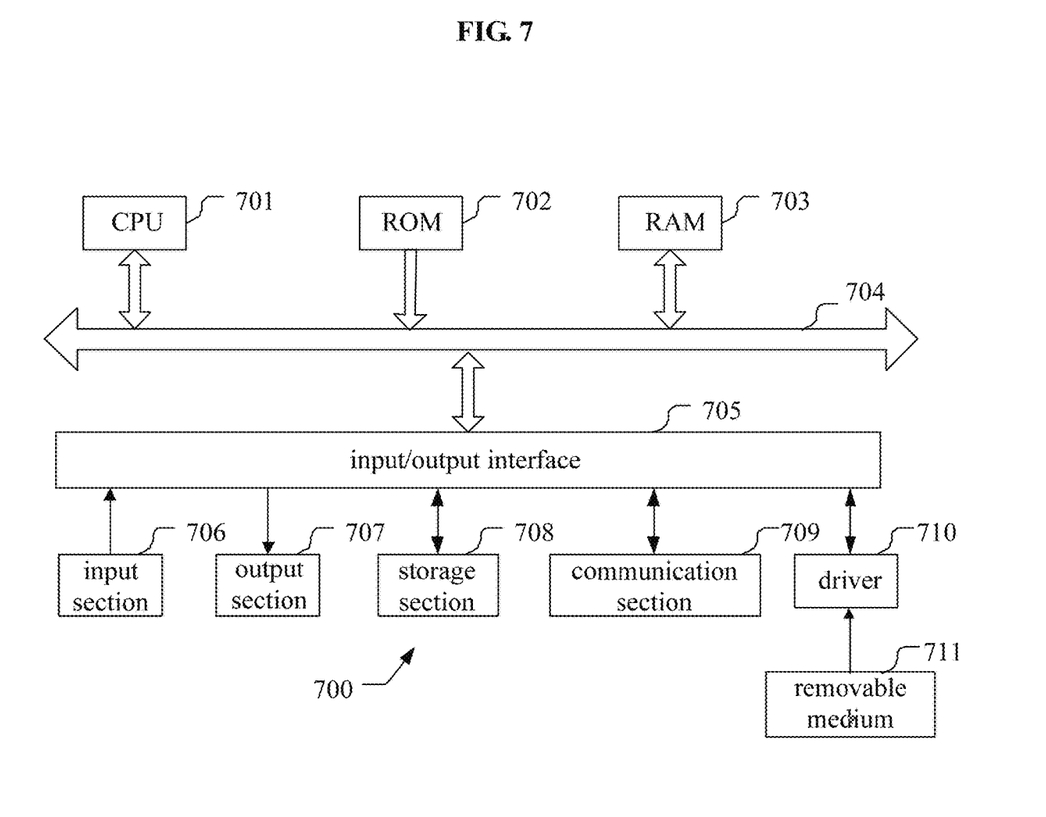
FIG. 7 is a schematic structural diagram showing a general-purpose machine 700 for implementing the device and the method for testing a blockchain network according to the embodiments of the present disclosure.

FIG. 7 is a schematic structural diagram showing a general-purpose machine 700 for implementing the device and the method for testing a blockchain network according to the embodiments of the present disclosure. The general-purpose machine 700 may be, for example, a computer system. It should be noted that, the general-purpose machine 700 is just an example, and is not intended to limit application ranges and functions of the device and the method provided in the present disclosure. Further, the general-purpose machine 700 should not be interpreted as having demands or requirements on any component or a combination thereof shown in the method and device for testing a blockchain network.

In FIG. 7, a central processing unit (CPU) 701 performs various types of processing according to programs stored in a read only memory (ROM) 702 or programs loaded from a storage portion 708 to a random access memory (RAM) 703. Data required when the CPU 701 performs various types of processing is stored in the RAM 703 as needed. The CPU 701, the ROM 702, and the RAM 703 are connected to each other via a bus 704. An input/output interface 705 is also connected to the bus 704.

The following components are connected to the input/output interface 705: an input portion 706 (including keyboard, mouse, and the like), an output portion 707 (including a display such as cathode ray tube (CRT) and liquid crystal display (LCD), a speaker and the like), a storage portion 708 (including hard disk, and the like), a communication portion 709 (including a network interface card such as LAN card, modem, and the like). The communication portion 709 performs communication processing via a network such as the Internet. A drive 710 may also be connected to the input/output interface 705 as needed. A removable medium 711 such as magnetic disk, optical disk, magneto-optical disk and semiconductor memory may be installed on the driver 710 as needed, so that the computer programs read from the removable medium 711 are installed in the storage portion 708 as needed.

In a case that the series of processing described above is implemented by software, programs constituting the software are installed from a network such as the Internet or a storage medium such as the removable medium 711.

Those skilled in the art should understand that the storage medium is not limited to the removable medium 711 shown in FIG. 7 that stores programs and is distributed separately from the device to provide the programs to the user. Examples of the removable medium 711 include: a magnetic disk (including floppy disk), an optical disk (including compact disk read only memory (CD-ROM) and digital versatile disk (DVD)), a magneto-optical disk (including mini-disk (MD) (registered trademark)) and a semiconductor memory. Alternatively, the storage medium may be the ROM 702, a hard disk included in the storage portion 708 or the like. The programs are stored in the storage medium, and the storage medium is distributed to the user together with the device including the storage medium.

Further, a computer program product storing computer readable program instructions is further provided in the present disclosure. The instruction codes, when being read and executed by a computer, cause the computer to perform the method for testing a blockchain network provided in the present disclosure. Accordingly, the storage mediums for carrying the program instructions listed above are included in the scope of the present disclosure.

In summary, a device for testing a blockchain network is provided in the present disclosure. After a fabric network is created, a dapp developer can update a configuration of the network and test a reasonability of the network by using the device for testing a blockchain network provided in the present disclosure. Further, a health condition of the network can be automatically monitored. If error information exists in transactions of the fabric network, a notification can be made to the dapp developer, and a recommendation for modifying the configuration of the fabric network can be provided.

A structure arrangement tool for network management is further provided in the present disclosure. The dapp developer can customize a configuration of the network in accordance with the solutions in the embodiments of the present disclosure.

A solution for managing a fabric network life cycle is further provided.

Specific implementations of the device and/or method according to the embodiments of the present disclosure are set forth in detail by means of block diagrams, flowcharts and/or examples. In a case that the block diagrams, flowcharts and/or examples include one or more functions and/or operations, those skilled in the art should understand that the functions and/or operations in the block diagrams, flowcharts and/or examples may be separately and/or concurrently implemented by hardware, software, firmware or any combination thereof. In an implementation, some parts of the subject described in this specification may be implemented in a form of an application specific integrated circuit (ASIC), a field-programmable gate array (FPGA), a digital signal processor (DSP) or other integrated forms. In addition, those skilled in the art should understand that, some aspects of the embodiments described in this specification may be entirely or partly implemented in an integrated circuit in a form of: one or more computer programs run on one or more computers (for example, on one or more computer systems), one or more programs run on one or more processors (for example, one or more microprocessors), firmware, or any combination thereof. Further, according to those disclosed in this specification, those skilled in the art can design the circuit used in the present disclosure and/or write the codes used in the software and/or the firmware in the present disclosure.

It should be noted that terms "include/comprise" used herein indicates existence of a feature, an element, a step or a component, but not excludes existence or addition of one or more features, elements, steps or components. Terms such as "first" and "second" do not intend to imply an operation order or importance degree of the features, the elements, the steps or the components, but are only for clarity to distinguish the features, the elements, the steps or the components.

In summary, in the embodiments of the present disclosure, the present disclosure provides the following solutions, but is not limited thereto. A device for testing a blockchain network, the device including: a processor configured to: calculate a matching degree between a configuration of the blockchain network and a template configuration corresponding to application scenario of the blockchain network; calculate performance of the blockchain network; calculate a health degree for the blockchain network; and determine whether or not the blockchain network is in a stable state based on the matching degree, the performance and the health degree.

The processor is further configured to: perform operations of backing up a ledger, suspending the blockchain network and issuing a notification, if it is determined that the blockchain network is in an unstable state.

The processor is further configured to: indicate the performance of the blockchain network by a ratio of a transaction confirmation rate to a transaction arrival rate, and monitor performance of a transaction, and analyze a cause of degradation in the performance when the performance degrades, wherein the cause of the degradation in the performance includes: recommending concurrent commit of the transaction if a latency in an endorsing phase of the transaction is longer than a first preset threshold; modifying a block time and a block size for a blockchain if a latency in a consensus phase of the transaction is longer than a second preset threshold; and automatically deleting peers with lower health degrees if a latency in a confirmation phase of the transaction is longer than a third preset threshold.

The processor is further configured to: indicate the health degree of the blockchain network by an average value of sums of health degrees of respective peers in the blockchain network.

The processor is further configured to: analyze a cause of an invalid transaction in the blockchain network; if endorsing times out, invalidate the transaction and recommend deleting endless loop in chaincode; if endorsing results are inconsistent, lower a credit rating of malicious nodes; if there is read/write conflict, recommend increasing a transmission interval for the transaction; and if an endorsing policy is not satisfied, recommend endorsing nodes satisfying the policy.

The processor is further configured to: make the health degree of the peer equal to a sum of an average value of health degrees of respective nodes in the peer and a credit rating of the peer.

The health degrees of the respective nodes in the peer are related to at least one of: survivability of the peer, number of cores of the processor, processing speed of the processor, storage speed, network speed, and consistency of ledgers.

The blockchain network to be tested is a blockchain network configured by: presenting, by a display device, configuration elements of the blockchain network to a user; creating or acquiring the blockchain network in response to visualized inputs of the user for selecting the configuration elements; determining security, performance and application scenario of the blockchain network; calculating a current configuration of the blockchain network based on the security, the performance and the application scenario of the blockchain network; and configuring the blockchain network by using the generated configuration.

When calculating the current configuration of the blockchain network, the processor is further configured to: S1: determine the application scenario of the blockchain network; and S2: calculate a default configuration of the blockchain network based on the application scenario of the blockchain network and default security and performance of the blockchain network, as the current configuration.

The processor is further configured to: S3: determine at least one of the security and the performance of the blockchain network; and S4: update the current configuration of the blockchain network based on at least one of the security and the performance of the blockchain network.

A device for configuring a blockchain network, the device including: a processor configured to: present, by a display device, configuration elements of the blockchain network to a user; create or acquire the blockchain network in response to visualized inputs of the user for selecting the configuration elements; determine security, performance and application scenario of the blockchain network; calculate a current configuration of the blockchain network based on the security, the performance and the application scenario of the blockchain network; and configuring the blockchain network by using the generated configuration.

When calculating the current configuration of the blockchain network, the processor is further configured to: S1: determine the application scenario of the blockchain network; and S2: calculate a default configuration of the blockchain network based on the application scenario of the blockchain network and default security and performance of the blockchain network, as the current configuration.

The processor is further configured to: S3: determine at least one of the security and the performance of the blockchain network; and S4: update the current configuration of the blockchain network based on at least one of the security and the performance of the blockchain network.

A computer readable medium having stored thereon computer readable program instructions that, when executed by a computer, cause the computer to function as the device according to any one of described devices.

Although the present disclosure is described by the specific embodiments, it should be understood that, those skilled in the art may make various changes, improvements or equivalents on the present disclosure within the spirit and scope of the appended claims. The changes, improvements or equivalents should be regarded as falling within the protection scope of the present disclosure.

The invention claimed is:

1. A device, comprising:
a processor configured to:
calculate a matching degree between a configuration of a blockchain network of nodes corresponding to blocks forming a blockchain and a template configuration corresponding to an application scenario of the blockchain network;
calculate a performance of the blockchain network, based on the template configuration;
calculate a health degree for the blockchain network, based on the template configuration; and
test the blockchain network based upon determining whether the blockchain network is in a stable state based on the matching degree, the performance and the health degree.

2. The device according to claim 1, wherein the processor is further configured to:
perform operations of backing up a ledger recorded by a node among the nodes, suspending the blockchain network and issuing a notification, when determined that the blockchain network is in an unstable state.

3. The device according to claim 1, wherein the processor is further configured to:
calculate the performance of the blockchain network by a ratio of a transaction confirmation rate by the nodes to a transaction arrival rate at the nodes, respectively, and
monitor performance of a transaction at a node among the nodes, and analyze a cause of degradation in the performance when the performance degrades,
wherein the cause of the degradation in the performance comprises:
recommending concurrent commit of a transaction when a latency in an endorsing phase in the blockchain of the transaction is longer than a first threshold;
modifying a block time and a block size for a block in the blockchain network if a latency in a consensus phase in the blockchain of the transaction is longer than a second threshold; and
deleting nodes among the nodes with lower health degrees when a latency in a confirmation phase in the blockchain of the transaction is longer than a third threshold.

4. The device according to claim 1, wherein the processor is further configured to:
   indicate the health degree of the blockchain network by an average value of sums of respective health degrees of the nodes in the blockchain network.

5. The device according to claim 4, wherein the processor is further configured to: make the health degree of the node equal to a sum of an average value of respective health degrees of the nodes in the blockchain network and respective credit ratings of the nodes.

6. The device according to claim 5, wherein the respective health degrees of the nodes in the blockchaing network are related to at least any one or combination of:
   survivability of the node,
   number of cores of the processor,
   processing speed of the processor,
   storage speed,
   network speed, and
   consistency of ledgers.

7. The device according to claim 1, wherein the processor is further configured to:
   analyze a cause of an invalid transaction in the blockchain in the blockchain network;
   when endorsing in the blockchain times out, invalidate the transaction and recommend deleting an endless loop in a chaincode;
   when endorsing results in the blockchain are inconsistent, lower a credit rating of malicious nodes;
   when there is read/write conflict in the blockchain, recommend increasing a transmission interval for the transaction; and
   when an endorsing policy in the blockchain is not satisfied, recommend endorsing nodes that satisfy the endorsing policy.

8. The device according to claim 1, wherein the blockchain network to be tested is a blockchain network configured by:
   presenting, by a display device, configuration elements of the blockchain network to a user;
   creating or acquiring the blockchain network in response to visualized inputs of the user for selecting the configuration elements;
   determining security, performance and application scenario of the blockchain network;
   calculating a current configuration of the blockchain network based on the security, the performance and the application scenario of the blockchain network; and
   configuring the blockchain network by using the generated configuration.

9. The device according to claim 8, wherein when calculating the current configuration of the blockchain network, the processor is further configured to:
   determine the application scenario of the blockchain network; and
   calculate a default configuration of the blockchain network based on the application scenario of the blockchain network and default security and performance of the blockchain network, as the current configuration.

10. The device according to claim 9, wherein the processor is further configured to:
    determine at least any one of the security and the performance of the blockchain network; and
    update the current configuration of the blockchain network based on at least any one of the security and the performance of the blockchain network.

11. A computer readable medium having stored thereon computer readable program instructions that, when executed by a computer, cause the computer to function as the device according to claim 1.

* * * * *